United States Patent
Lennaerts

(10) Patent No.: US 8,271,664 B2
(45) Date of Patent: Sep. 18, 2012

(54) METHOD FOR SETTING UP A PEER-TO-PEER LINK BETWEEN TWO COMMUNICATION MEDIA

(75) Inventor: Johannes Christiaan Theodor Lennaerts, Venlo (NL)

(73) Assignee: V.S.N. Systemen B.V., Venray (NL)

( * ) Notice: Subject to any disclaimer, the term of this patent is extended or adjusted under 35 U.S.C. 154(b) by 160 days.

(21) Appl. No.: 12/520,292

(22) PCT Filed: Nov. 9, 2007

(86) PCT No.: PCT/NL2007/000280
§ 371 (c)(1),
(2), (4) Date: Aug. 31, 2009

(87) PCT Pub. No.: WO2008/075939
PCT Pub. Date: Jun. 26, 2008

(65) Prior Publication Data
US 2010/0023629 A1    Jan. 28, 2010

(30) Foreign Application Priority Data
Dec. 21, 2006    (NL) .................................. 1033102

(51) Int. Cl.
*G06F 15/16* (2006.01)
(52) U.S. Cl. .................................. 709/228; 709/227
(58) Field of Classification Search ........... 709/227–228
See application file for complete search history.

(56) References Cited

U.S. PATENT DOCUMENTS

| | | | | |
|---|---|---|---|---|
| 7,583,682 | B2 * | 9/2009 | Hopkins ....................... | 370/401 |
| 7,643,479 | B2 * | 1/2010 | Fujiwara et al. ............... | 370/389 |
| 7,676,579 | B2 * | 3/2010 | Harris et al. ................... | 709/227 |
| 7,706,373 | B2 * | 4/2010 | Xu et al. ........................ | 370/392 |
| 2005/0195851 | A1 * | 9/2005 | Banerjee et al. ............... | 370/437 |
| 2006/0182100 | A1 | 8/2006 | Li et al. | |
| 2007/0127367 | A1 * | 6/2007 | Ogasahara et al. ............ | 370/226 |

(Continued)

FOREIGN PATENT DOCUMENTS

WO    2004/063843    7/2004

(Continued)

OTHER PUBLICATIONS

PCT International Search Report for PCT/NL2007/000280 filed on Nov. 9, 2007 in the name of V.S.N. Systemen B.V.

(Continued)

*Primary Examiner* — Minh-Chau Nguyen
(74) *Attorney, Agent, or Firm* — Steinfl & Bruno LLP

(57) ABSTRACT

A method for setting up a peer-to-peer communication link between a first communication medium (3) and a second communication medium (4) by means of a mediation server (5), wherein the first communication medium (3) comprises a multitude of communication ports, which are assigned in dependence on the destination by the first communication medium (3) for setting up communication links, and wherein a first communication port of the first communication medium (3) has been assigned for communication with the mediation server (5). The method further comprises the steps of composing port identification data of a second communication port yet to be assigned of the first communication medium (3), the first communication medium (3) sending the port identification data to the second communication medium (4) via the mediation server (5), and the first communication medium (3) assigning the second communication port for setting up the peer-to-peer communication link.

21 Claims, 2 Drawing Sheets

U.S. PATENT DOCUMENTS

2008/0080518 A1* 4/2008 Hoeflin et al. ............ 370/395.42
2008/0165802 A1* 7/2008 Tang .............................. 370/466

FOREIGN PATENT DOCUMENTS

WO    2005/088466    9/2005

OTHER PUBLICATIONS

PCT Written Opinion for PCT/NL2007/000280 filed on Nov. 9, 2007 in the name of V.S.N. Systemen B.V.

Ford, B., et al., Peer-to-Peer Communication Across Network Address Translators, Proceedings of the Unisex Annual Technical Conference 2005, 179-192.

Electronic Communication Committee (ECC), Technical Issues of Establishing Any-to-Any 2-Way Real-Time Communications over the Internet, Apr. 24, 2004, 7 pages.

Ford, B., et al., Peer-to-Peer (P2P) Communication Across Network Address Translator (NAT), IETF Standard-Working-Draft, Internet Engineering Task Force, IETF, CH, No. 2, Mar. 2004, 1-17.

* cited by examiner

METHOD FOR SETTING UP A PEER-TO-PEER LINK BETWEEN TWO COMMUNICATION MEDIA

CROSS REFERENCE TO RELATED APPLICATIONS

The present application is the US national stage of International Application PCT/NL2007/000280 filed on Nov. 9, 2007 which, in turn, claims priority to Dutch Application 1033102, filed on Dec. 21, 2006.

The present invention relates to a method for setting up a peer-to-peer communication link between a first communication medium and a second communication medium by means of a mediation server, wherein the first communication medium comprises a plurality of communication ports, which communication ports are assigned in dependence on the destination by the first communication medium for setting up communication links, and wherein a first communication port of the first communication medium has been assigned for communication with the mediation server.

One of the driving forces behind the Internet is that users anywhere in the world can communicate with other users and exchange large amounts of data, if desired. One of the manners in which users can exchange data is by setting up peer-to-peer communication links between computers. Services such Internet telephony ("voice over IP"—VOIP) or other multimedia services make use of peer-to-peer links for exchanging digitised speech signals, video signals or other large amounts of data.

Computers can be traced on the Internet via a network address. The network address is a unique code linked to a specific location on the Internet. As suggested above, such a specific location can be used by a single computer, but the unique network address can also provide access to a local network ("local area network"—LAN) of two or more computers.

Each computer furthermore has a plurality of communication ports over which communication links can be set up and data can be exchanged. To set up a communication link, it is therefore necessary not only to know the network address of the computer in question, but also the communication port over which communication is to take place.

For practical and security reasons, use is made of network address translation (NAT) for setting up communication links between communication media on the Internet. Communication media such as individual computers or local area networks of two or more computers are usually located on virtual private domains. The Internet forms the public domain in that case. On the Internet, i.e. in the public domain, communication media can be accessed via a public network address. In addition to that, private network addresses may be used in the private domain. To ensure that not just anybody in the virtual public domain can gain access to communication media connected to the Internet, the opening and closing of communication ports of a public network address is controlled by the translation protocol for network addresses. The present document relates to the control of access to, and assignment of, public network addresses and communication ports for data communication, which takes place in the network address translation (to be referred to below as NAT).

The point of departure in setting up peer-to-peer links is that an internal host (first communication medium) behind an NAT in a first private domain wants to exchange data, via the public domain, with an internal host (second communication medium) behind an NAT in a second private domain, and vice versa. Once the communication link has been set up, all is well and communication can normally take place. Problems usually arise, however, upon setting up the link, since an NAT is not capable of determining in advance whether an external communication medium is reliable and a communication port can be opened. This will be explained hereinafter.

The most commonly used NAT devices can operate in various ways, and at present the following NAT methods can be distinguished: full cone NAT, address restricted cone NAT, port restricted cone NAT and symmetric NAT.

In the case of full cone NAT, an internal communication medium that wants to communicate sends a data packet to a public network address on the Internet. To communicate the data packet, the NAT will assign a communication port, over which the data packet will be sent, to the internal host (for example the programme on the internal communication medium that wants to send the packet): the communication port is thus open to all the outgoing data from the internal host. In the case of full cone NAT, the assigned communication port is also opened to all the incoming data to the internal host to which the port has been assigned. Incoming data not intended for the internal host but nevertheless sent over the assigned port will be rejected by the NAT.

In the case of address restricted cone NAT, an additional limitation has been imposed on the freedom of reception of data packets on the assigned communication port. When an internal communication medium sends a data packet to an external communication medium on the Internet, i.e. to a destination address on the Internet, the NAT will only accept data packets that come from the destination address. Said data packets will be forwarded to the internal communication medium, and data packets which are received on the opened communication port in question but which come from another external network address will be rejected by the NAT.

In the case of port restricted cone NAT, the reception of data packets is not only limited to the external destination address from which the data packets come, but the NAT also looks at the external communication port number of the external communication medium on the external destination address from which the packets were sent. Data received from the trusted external destination address (i.e. the destination address to which the internal host sent its data packets), but from a different communication port number on said address, will be rejected by the NAT.

The above NAT methods have in common the fact that a communication port is assigned for sending data in dependence on the internal host that wants to send the data. Once the communication port has been assigned, the various types of NAT are different from each other in that each of said types of NAT imposes stringent or less stringent limitations on the reception of data over the assigned communication port.

In the case of symmetric NAT, assignment of the communication ports does not or not only take place in dependence on the internal host that wants to send the data. Symmetric NAT is different in particular in that port assignment takes place in dependence on the destination of the data flow, i.e. for example on the basis of the destination address or on the basis of both the destination address and the destination port. In other words, when the internal host sends a data packet to the destination address A, communication port $P_a$, for example, will be opened to data exchange between the internal host and destination A. When the internal host subsequently sends a data packet to destination B, the symmetric NAT will open a communication port $P_b$ for communication between the internal host and destination B.

The setting up of a peer-to-peer link usually takes place via a central server. The method for network address translation and port assignment that is used by symmetric NAT's constitutes a problem when peer-to-peer links over telecommunication networks are set up in a conventional manner. After all, the internal communication port communicates with the central server for setting up the peer-to-peer link. The central server forwards the request to set up a peer-to-peer link between the internal hosts and the destination to the destination, which may accept this request, if desired. Once accepted, the network address and the assigned communication port of the internal hosts are known to the destination. Since the external communication medium on the destination passes on its own address (the destination address) and port (the destination port) to the central server, the information can be exchanged with the internal host.

When both the internal host and the external communication medium use NAT methods that assign ports independently of the internal host, such as the cone NAT methods, the peer-to-peer link can be set up by simply sending, from the internal host or from the external communication medium, or from both, data packets directly to each other i.e. from the internal host to the destination address and the destination port, and/or from the external medium to the network address of the internal host and the assigned communication port number thereof. This will go well even in the case of port restricted cone NAT, as the ports are opened for receiving data from each of the involved parties by sending the data packets. The fact is that assignment only takes place in dependence on the internal host that requests said assignment.

On the other hand, if one of the parties uses symmetric NAT, the above method will not work, because the assigned communication port number of the party that uses symmetric NAT will be assigned in dependence on the destination. If this is the first communication medium, for example, the internal host will initially communicate with the central server and will thus use a communication port that has been assigned especially for data exchange with the central server. When the central server passes on the network address and the assigned communication port number to the party with which a peer-to-peer link is to be set up, and the internal host also receives the required data of the new destination address from the central server, a new port assignment will take place on the side of the internal host in dependence on the new destination address. When data are thus sent from the new destination address to the network address and the port number passed on by the central server, said data will be rejected on the side of the internal host, since the communication port number that is used was only assigned for data exchange with the central server and not with the destination address. Those skilled in the art will realise that this problem will worsen when both parties use symmetric NAT methods.

It is an object of the present invention to provide a method for setting up a peer-to-peer link between two communication media which solves the above-described problems of the prior art and by means of which a peer-to-peer link can be easily set up with any type of NAT. This object is accomplished by the present invention in that it provides a method of setting up a peer-to-peer communication link between a first communication medium and a second communication medium by means of a mediation server, wherein the first communication medium comprises a plurality of communication ports, which communication ports are assigned to destination dependent by the first communication medium for setting up communication links, and wherein a first communication port of the first communication medium has been assigned for communication with the mediation server, further comprising the steps of:

a) composing port identification data of a second communication port yet to be assigned of the first communication medium;

b) the first communication medium sending the port identification data to the second communication medium via the mediation server; and c) the first communication medium assigning the second communication port for setting up the peer-to-peer communication link.

With the method according to the invention it is already determined in advance which communication port will probably be assigned to a new communication link with the destination medium that is to be set up. By making this assessment prior to setting up a link, the information can be provided to the second communication medium via the mediation server, and the second communication medium will know to which communication port of the first communication medium data packets are to be directed so as to be able to successfully establish a link.

The eventual assignment of the second communication port can take place by sending a message to the second communication medium. For example, when the first communication medium sends a data packet to the second communication medium (for example after a destination address and a port number have been provided), the symmetric network address translation will assign a communication port for data exchange between the first communication medium and the second communication medium.

The above method can be used in particular when, for example, one of the communication media uses symmetric network address translation, as already described before. Those skilled in the art will appreciate, however, that also other forms of network address translation wherein communication ports are assigned in dependence on the destination may benefit from the above-described method.

In a special embodiment of the present invention, a session initiation protocol (SIP) is sent. Session initiation protocol is a protocol which is suitable in particular for setting up communication links for voice over IP. In this context session initiation protocol performs a number of functions which are performed by "signalling" functions in conventional circuit-switched telephony.

Many network address translation methods have been adapted for use of the session initiation protocol. If the network address translation is suitable for SIP, the SIP message can be read by the network address translation unit and be rewritten. More in particular, information about the communication port to be assigned for setting up a link with a specific destination address can be written into the session description protocol (SDP) of the session initiation protocol (SIP) message. Consequently, if the internal host is able to simulate the sending of a session initiation protocol message, the network address translation unit will write the communication port to be assigned for a new communication link to be set up by the internal host into the simulated session initiation protocol message. By sending this session initiation protocol message to the mediation server, the mediation server is informed about the communication port yet to be assigned.

According to a special embodiment of the method according to the invention, assignment of the second communication port for setting up the peer-to-peer link takes place independently of the destination. This may for example take place after receipt of the simulated session initiation protocol message by the network address translation unit.

The symmetric network address translation can thus be sidelined when a peer-to-peer link is to be set up. In this way it is possible to set up a communication link with the internal host independently of the destination, for example with several external communication media, after sending a session initiation protocol message.

Since the second communication medium may receive the information from the mediation server with some delay, or because the second communication medium needs time to process said information, the assignment of communication ports at the second communication medium may take place with some delay. Those skilled in the art will appreciate that when the second communication medium uses address restricted cone NAT or port restricted cone NAT, the messages sent by the first communication medium will not be received until the second communication medium has opened the communication ports in question.

The method according to the invention can be used by the first communication medium, by the second communication or by both communication media. More in particular, the second communication medium, for example, comprises a multitude of further communication ports, which further communication ports are assigned destination dependent by the second communication medium for setting up communication links, and wherein a third communication port of the second communication medium has been assigned for communication with the mediation server, wherein the method further comprises the steps of:

d) composing further port identification data of a fourth communication port yet to be assigned of the second communication medium;

e) the second communication medium sending said further port identification data to the first communication medium via the mediation server; and f) the second communication medium assigning the fourth communication port for setting up the peer-to-peer communication link.

Such a method makes it possible to establish a peer-to-peer link even if both communication media use symmetric network address translation.

Similarly to the assignment of the second communication port, the fourth communication port can be assigned in that the second communication medium sends a message to the first communication medium. Furthermore, the second communication medium, too, can simulate a session initiation protocol message similarly to the manner in which the first communication medium simulates a session initiation protocol, as described above.

If it still appears to be impossible to establish a peer-to-peer link when using the method according to the invention, wherein the communication ports to be assigned are identified and communicated to the other party prior to said assignment, the method according to the invention may further comprise the steps of:

g) the second communication medium determining a group of communication ports to be possibly assigned from said multitude of communication ports of the first communication medium; and h) sending a multitude of messages from the second communication medium to the one or more communication ports of the group of communication ports to be possibly assigned of the first communication medium. This method can also be used by the first communication medium.

More in particular, said determining of a group of communication ports to be possibly assigned and said sending of a multitude of messages to each of the communication ports of the group of communication ports to be possibly assigned may also take place in advance, before steps a), b) and c) or d), e) and f) are carried out.

The method according to the invention will now be explained in more detail by means of a description of a non-limitative embodiment thereof, wherein reference is made to the appended figures, in which.

Figure 1:
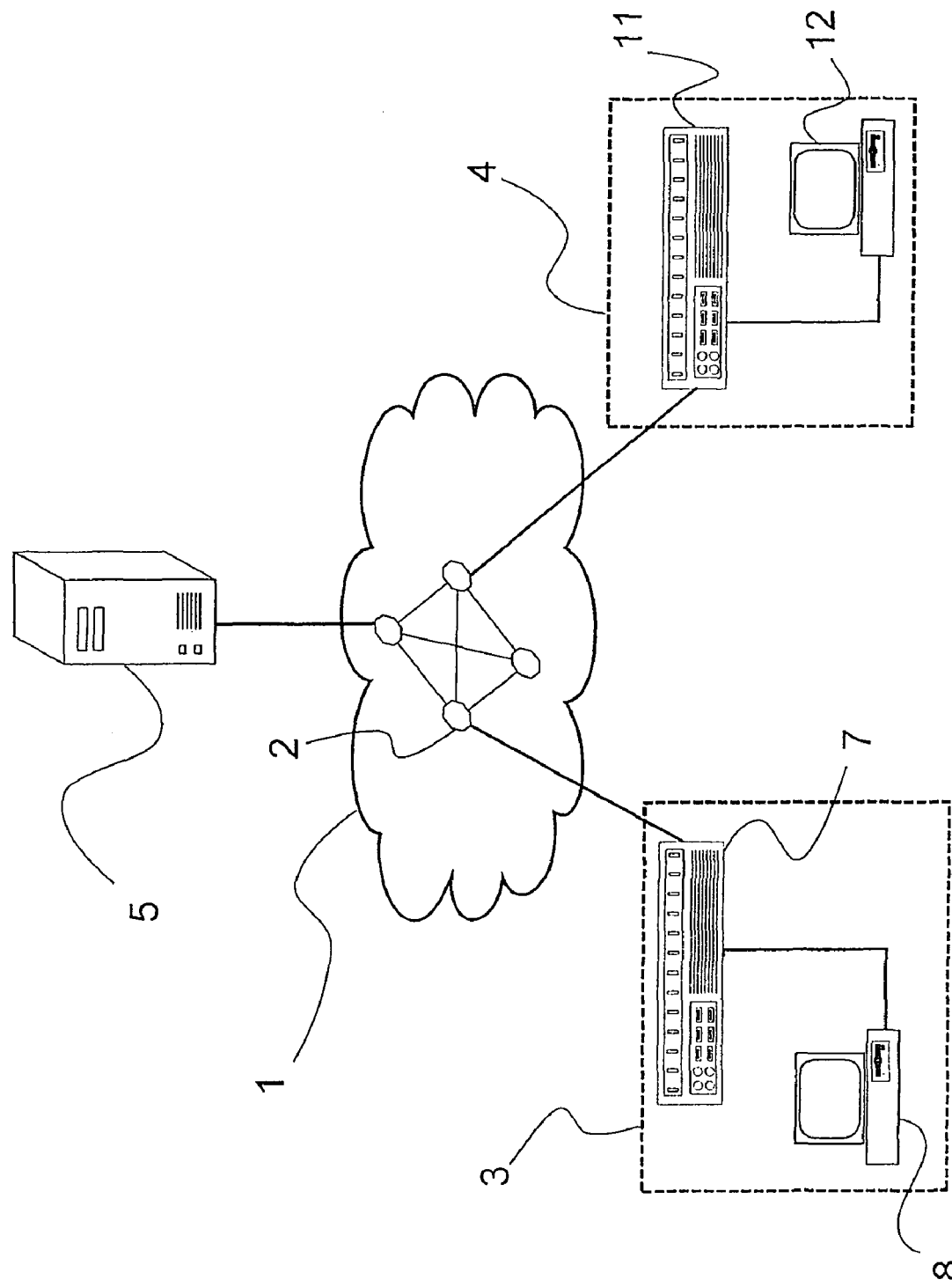
FIG. 1 shows a network environment in which the present invention can be used.

FIG. 1 shows an environment comprising a public data network 1, such as the Internet, consisting of a multitude of nodes, such as the node 2, which are interconnected somehow so as to enable data transfer therebetween. Connected to the nodes 2 of the network 1 are a first communication medium, schematically indicated in box 3, a second communication medium, schematically indicated in box 4, and a mediation server 5. The first communication medium 3 comprises at least one computer 8, which is connected to the node 2 by means of a router 7. The second communication medium 4 comprises at least one computer 12, which is connected to one of the nodes of the data network 1 by means of a router 11.

For security reasons, and in order to set up paths over the data network 1 for the transfer of data, the routers 7 and 11 use a network address translation (NAT) method. Said network address translation arranges for the assignment of a communication port for external communication to an internal host, for example an application active on the computer 8. Via said communication port, the internal host can communicate over the public data network 1. The network address translation also arranges for the translation of network addresses, which are used internally by the first communication medium 3, for example, to the external network address assigned on the public data network 1.

The first communication medium 3 may for example consist of a corporate network. For internal communication over the corporate network, the computer 8 can for example be reached via an internal network address. If a link with an external party, for example the server 5, is to be set up, however, the internal network address cannot be used for external data exchange. After all, the internal network address is only known within the corporate network 3 and not on the public data network 1 outside said network. The corporate network 3 can be reached on the public data network 1 via an external data address, however. If data intended for the corporate network 3 are sent to the external network address of the first communication medium 3, said data will be received by the router 7.

Internal and external communication within and with the second communication medium 4 takes place in a similar manner. An internal network address has been assigned to the computer 12, and the router 11 arranges for the required translation from and to the external network address of the second communication media 4. Several network address translation methods are conventionally used. The most important methods are full cone NAT, address restricted cone NAT, port restricted cone NAT and symmetric NAT.

The symmetric network address translation method is different from the other network address translation methods in the sense that communication ports for external data exchange are assigned to the internal hosts in dependence on the destination in this method. In the other network address translation methods, external communication ports are assigned in dependence on the requesting internal host, such as a computer 8.

When the computer 8 wants to set up a peer-to-peer link with the computer 12 in the network environment shown in FIG. 1, this proceeds in a conventional manner via a mediation server 5. When a network address translation method is used in which assignment of communication ports takes place in dependence on the internal host that requests the communication, for example port restricted cone NAT, the method for setting up the peer-to-peer link proceeds as follows. The computer 8 contacts the server 5 via the router 7 and the data network 1. The computer 8 indicates to the server 5 that a peer-to-peer link is to be set up with the computer 12 in the second communication medium 4 (assuming in this case that the computer 12 has already been signed in and has declared itself prepared to receive peer-to-peer links).

The server 5, which is already in communication with the computer 12 via the external communication port of the second communication medium 4 that has been assigned by the router 11, passes on this external port number to the first communication medium 3. Conversely, the mediation server 5 passes on the external port number of the communication medium 3 that the router 7 has assigned to the communication medium 4. Both communication media 3 and 4 now know the external ports for communication with the mediation server 5 that have been assigned to the computers 8 and 12 of the communication media 3 and 4, respectively. The computers 8 and 12 can now start sending data packets directly to each other.

When the computer 8 sends the first packet in the direction of the computer 12, said first packet will be rejected by the router 11 if the second communication medium 4 has not sent any packets to the first communication medium 3 yet. After all, it does not come from the mediation server 5 with which the router 11 has already communicated. When the first data packet is sent from the communication medium 3 to the communication medium 4, however, the router 7 will become receptive to data packets from the network address and the communication port of the second communication medium 4 provided by the computer 8. When subsequently the communication medium 4 sends a data packet to the communication medium 3, to the communication port whose number was provided to the communication medium 4 by the mediation server 5, said communication port will meanwhile have been opened to data from the communication medium 4. Furthermore, the communication port assigned to the commuter 12 is opened to data from the communication medium 3 in the router 11 by sending the data packet to the communication medium 3. Accordingly, if sufficient data packets are sent back and forth, the peer-to-peer link between the communication medium 3 and the communication medium 4 will be automatically established.

The method as described above cannot be used, however, if at least one of the communication media 3 or 4 comprises a router (7 or 11, respectively) that uses symmetric network address translation. The assignment of communication ports will not take place in dependence on the internal host that requests communication (in the above example a single external communication port was assigned to the computer 8, and a dedicated communication port was assigned to the computer 12 by the router 11) in that case, but port assignment takes place in dependence on the destination. In other words, when the computer 8 sends a message to the mediation servo 5, the router 7 will assign a communication port, for example port # 6891, and when a computer 8 subsequently wants to send data to the second communication medium 4, data will be sent to another destination, and the router 7 will assign a different port number, for example port # 6892. The method as described above, in which the mediation server 5 exchanges communication information, such as the address and port number, between the computers 8 and 11 for setting up the link, therefore fails when at least one of the parties uses symmetric network address translation.

Figure 2:
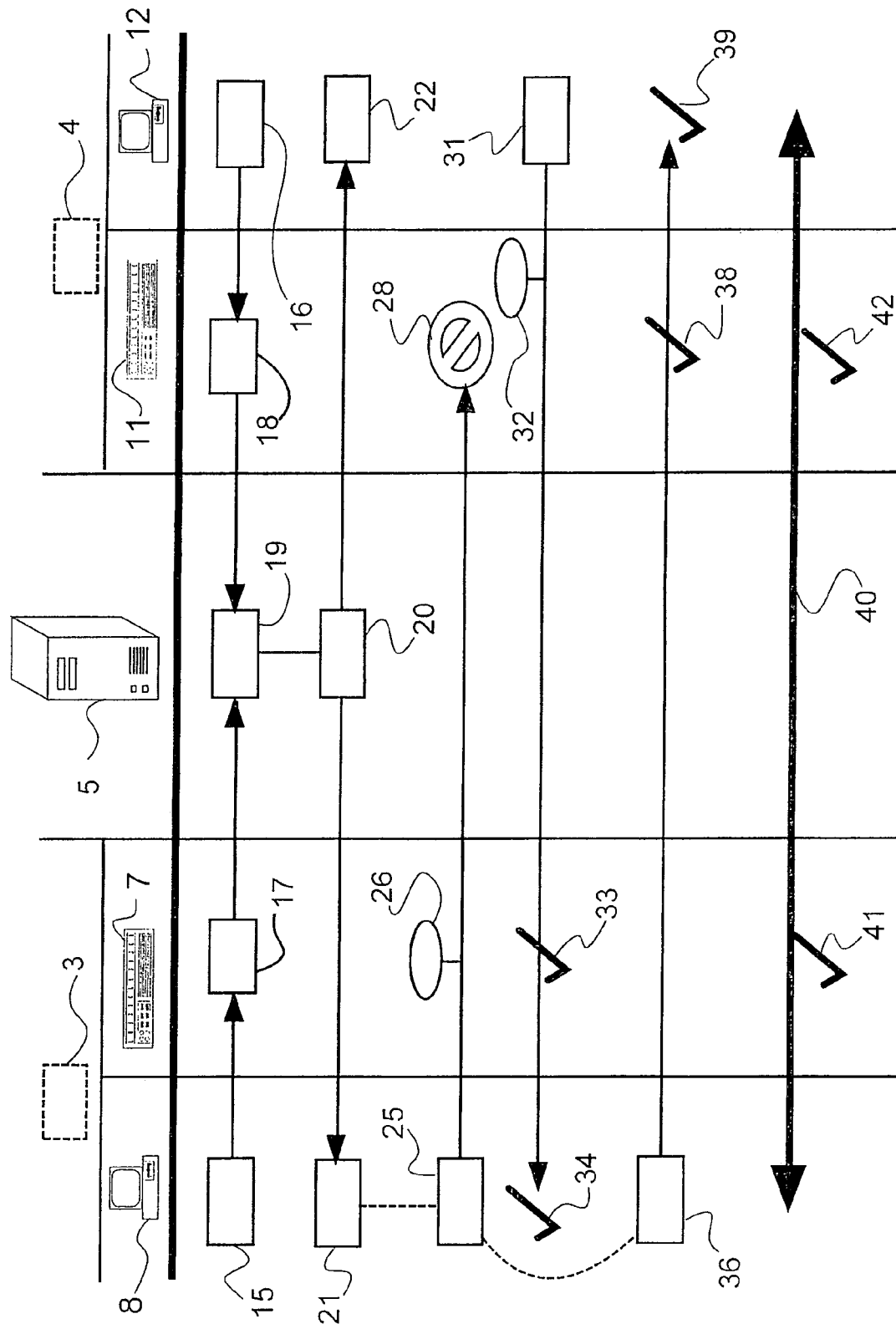
FIG. 2 shows a method according to the invention for setting up a peer-to-peer link in the environment shown in FIG. 1.

FIG. 2 is a schematic view of a method for setting up a peer-to-peer link according to the present invention. In the diagram of FIG. 2, the communication between the various units shown in FIG. 1 is schematically indicated. The first two columns relate to method steps which are carried out by the first communication medium 3, as indicated above the two lefthand columns. The method steps and actions carried out on the side of the mediation server 5 are shown in the centre column of the diagram of FIG. 2. The two right-hand columns indicate actions which are carried out on the side of the second communication medium 4. Above the two left-hand columns it is indicated which of the method steps is carried out by the computer 8 and which of the method steps is carried out upon network address translation in the router 7. Accordingly, it is indicated in the two right-hand columns of the diagram in FIG. 2 which of the method steps is carried out by the router 11 and which method steps are carried out by the computer 12. The method as described herein proceeds from the assumption that the two computers 8 and 12 have already signed on to the mediation server 5, and that one of the computers, for example the computer 8, sends a request to the mediation servo 5 to set up a peer-to-peer link. The mediation server 5 has in the meantime informed the computer 12 of said request, and the peer-to-peer link must now be set up.

The method according to the present invention employs a method in which the port identification data of a communication port yet to be assigned (i.e. for data not yet sent intended for a new destination) can be composed in various ways in advance. One of said ways will be explained in more detail with reference to FIG. 2. In step 15, the computer 8 sends a session initiation protocol (SIP) message to the mediation server 5. The session initiation protocol is a type of protocol which is used in setting up Internet telephone connections. The SIP message has been introduced so as to adapt a number of services that are carried out by means of signalling messages in a regular circuit-connected telephone network for use in Internet telephony.

When the computer 8 simulates a session initiation protocol message directed to the mediation server 5, the router 7 will respond to this by identifying the communication port that will be used for the next destination to which data will be sent in the session description protocol (SDP) portion of the SIP message. Inclusion of said data in the SIP message takes place in step 17. The SIP message is subsequently received by the mediation server, which can obtain the port identification data of a communication port yet to be assigned of the communication medium 3 from the SIP message. Similarly, the computer 12 of the communication medium 4 will simulate a similar SIP message, to which the router 11 responds by showing the port identification data of the communication port yet to be assigned of the communication medium 4 in the SDP portion thereof. The mediation server 5 has now received port identification data of the communication ports yet to be assigned of the two communication media 3 and 4 from both communication media.

In step 20 the mediation server 5 will forward the port identification data from the communication medium 3 to the computer 12 with which the mediation server 5 maintains an active communication link. Similarly, the mediation server will forward the port identification data of the communication media 4 to the communication medium 3.

Now the setting up of the direct peer-to-peer link from the communication medium 3, via the data network 1, to the communication medium 4 can be started. In the method described with reference to FIG. 2 it is assumed that the communication medium 3 will be the first to start sending data packets to the communication medium 4. Those skilled in the art will appreciate that the reverse is also possible, in which case the communication 4 will be the first to start sending data packets to the communication medium 3.

In step 25 the computer 8 sends a data packet to the communication port whose port identification data the computer 8 received from the mediation server 5 in step 21. By sending a data packet to the identified communication port of the communication media 4, the router 7 will recognise that data are being sent to a new destination address on the public data network 1. Consequently, the router 7 will assign a communication port for said new destination in step 26. The communication port that is assigned by the router 7 for communication with a communication medium 4 is the communication port already identified in step 17 and included in the SIP message by the router 7. Since the external network address of the communication medium 3 is not known yet in the router 11 of the communication medium 4, the router 11 will reject the data packet upon receipt thereof, as is schematically indicated by the prohibition sign 28. What has been achieved, however, is the fact that the router 7 is now open to data from the communication medium 4, providing that said data are presented on the communication port identified in step 17 and opened in step 26.

Similarly, a data packet will be sent to the communication medium 3 at some point after receipt of the data from the mediation server 5 in step 22. The computer 12 sends the data packet to the communication port whose port identification data have been received from the mediation server 5 in step 22. This is the communication port that was identified to the mediation server 5 by the router 11 in step 17. In step 32, the router 11 will open the communication port identified in step 18 to data exchange with the new destination, viz. the communication medium 3, by sending said data packet. The data packet is thus sent to the communication medium 3 via the communication port identified in step 18, at which communication medium 3 the data packet is received on the communication port opened in step 26 and identified by the router 7 in step 17. The router 7 recognises that the data packet comes from the communication medium 4, to which it has opened the communication port, and consequently it will allow the data packet two parts, as indicated by checkmark 33. The data packet is received by the computer 8, as is schematically indicated by checkmark 34.

The computer 8 may send a data packet to the communication 4, for example, as is indicated in step 36. Said data packet will again be directed to the communication port identified by the router 11 in step 18, whose port identification data were received by the computer 8 in step 21. This time, the data packet is recognised by the router 11 as coming from the communication medium 3 to which the aforesaid communication port of the communication medium 4 has been opened. As is indicated by checkmark 38, the data packet is therefore forwarded to the computer 12. The computer 12 subsequently receives the data packet, as indicated by checkmark 39.

As is indicated by the double arrow 40, the peer-to-peer link between the communication media 3 and the communication media 4 is now set up, and data from said communication medium will be accepted by the respective routers 7 and 11 (as is indicated by checkmarks 41 and 42). This peer-to-peer link indicated by the double arrow 40.

In an alternative embodiment one party, or both parties, send(s) an amount of data packets to a number of communication ports of the other communication medium, whether or not instead of the SIP message, or in addition thereto, wherein the selected ports of the other communication medium are determined on the basis of knowledge of frequently used assignment protocols and patterns for assigning communication ports. Suppose, for example, that the method described with reference to FIG. 2 does not proceed satisfactorily and the peer-to-peer link cannot be established by means of this method. The mediation server 5 is now only aware of the communication ports and network addresses via which the mediation server itself communicates with the other communication medium. The mediation server 5, for example, knows the communication port and the network address of the communication medium 4 over which the direct communication between the mediation server 5 and the communication 4 takes place. The mediation server 5 can pass this information on to the communication medium 3. Similarly, the network address and the port identification data of the communication port of the communication medium 3 with which the communication medium directly communicates with the mediation server 5 can be passed on to the communication medium 4. On the basis of this an estimate can be made of the port numbers that will possibly be assigned. Upon receipt of the data, the communication medium 3 may send ten data packets, for example, simultaneously or sequentially to, for example, ten consecutively numbered communication ports. This may be repeated a number of times until, for example, the communication medium 4 has actually opened one of said ports. When one of the data packets reaches the communication media 4, a peer-to-peer link can be established. This method can for example be used when only one of the parties uses symmetric network translation.

The skilled person can freely choose which one of the above-described methods will be used. The skilled person can also change the sequence in which the above-described methods will be used, if desired. Generally it is preferable to have the method aimed at stimulating and SIP message precede the methods in which a number of data packets are sent to a variety of communication ports. If desired, however, the methods may also be used in reverse order or be used separately.

The methods as illustrated and described above have only been provided by way of illustration of the principle of the invention. The scope of the invention is exclusively limited by the appended claims.

The invention claimed is:

1. A method of setting up a peer-to-peer communication link between a first communication medium and a second communication medium by means of a mediation server, wherein the first communication medium comprises a plurality of communication ports, which communication ports are assigned destination dependent by the first communication medium for setting up communication links, and wherein a first communication port of the first communication medium has been assigned for communication with the mediation server, further comprising the steps of:
   a) composing port identification data of a second communication port yet to be assigned of the first communication medium, wherein the composed port identification data of the second communication port is with dependence on a destination address of the second communication medium;
   b) the first communication medium sending the port identification data to the second communication medium via the mediation server; and
   c) the first communication medium assigning the second communication port for setting up the peer-to-peer communication link.

2. The method according to claim 1, wherein the second communication medium comprises a plurality of further communication ports, which further communication ports are assigned by the second communication medium destination dependent for setting up communication links, and wherein a third communication port of the second communication medium has been assigned for communication with the mediation server, further comprising the steps of:

d) composing further port identification data of a fourth communication port yet to be assigned of the second communication medium;

e) the second communication medium sending said further port identification data to the first communication medium via the mediation server; and f) the second communication medium assigning the fourth communication port for setting up the peer-to-peer communication link.

3. The method according to claim 2, wherein said further port identification data are sent to the mediation server in a further session initiation protocol (SIP) message.

4. The method according to claim 3, wherein the second communication medium comprises means for assigning communication ports, which means modify said further session initiation protocol (SIP) message for including said further port identification data therein.

5. The method according to claim 2, comprising the steps of:

g) the second communication medium determining a group of potentially to be assigned communication ports of said plurality of communication ports of the first communication medium; and h) sending a plurality of messages from the second communication medium to the one or more communication ports of the group of potentially to be assigned communication ports of the first communication medium.

6. The method according to claim 5, wherein steps g) and h) are carried out prior to carrying out steps a), b) and c).

7. The method according to claim 5, wherein steps g) and h) are carried out after carrying out steps a), b) and c) in case the setting up of the peer-to-peer link by means of steps a), b) and c) fails.

8. The method according to claim 2, comprising the steps of:

i) the first communication medium determining a group of further potentially to be assigned communication ports of said plurality of further communication ports of the second communication medium; and j) sending a plurality of messages from the second communication medium to the one or more further communication ports of the group of further potentially to be assigned communication ports of the second communication medium.

9. The method according to claim 8, wherein steps i) and j) are carried out prior to carrying out steps a), b) and c).

10. The method according to claim 8, insofar as dependent on at least one of the claims 2-14, wherein steps i) and j) are carried out after carrying out steps a), b), c), d), e) and f) if the setting up of the peer-to-peer link by means of steps a), b), c), d), e) and f) fails.

11. The method according to claim 2, wherein the fourth communication port is assigned by sending a message to the first communication medium.

12. The method according to claim 2, wherein the second communication medium uses symmetric network address translation for assigning further communication ports.

13. The method according to claim 2, wherein in step f) the fourth communication port is assigned destination independent for setting up the peer-to-peer link.

14. The method according to claim 2, insofar as dependent on claim 11, wherein the sending of a message to the first communication medium is repeated until the peer-to-peer link has been established.

15. The method according to claim 1, wherein said second communication is assigned by sending a message to the second communication medium.

16. The method according to claim 15, wherein the sending of a message to the second communication medium is repeated until the peer-to-peer link has been established.

17. The method according to claim 1, wherein the port identification data are sent to the mediation server in a session initiation protocol (SIP) message.

18. The method according to claim 17, wherein the first communication medium comprises means for assigning communication ports, which means modify the session initiation protocol (SIP) message for including the port identification data therein.

19. The method according to claim 1, wherein the first communication medium uses symmetric network address translation for assigning communication ports.

20. The method according to claim 1, wherein in step c) the second communication port is assigned destination independent for setting up the peer-to-peer link.

21. The method according to claim 1, wherein in step b) the first communication port of the first communication medium sends the port identification data to the second communication medium via the mediation server.

* * * * *